United States Patent
Miyasato et al.

(10) Patent No.: US 9,489,384 B2
(45) Date of Patent: Nov. 8, 2016

(54) CONTENT PROVIDING TECHNIQUES

(75) Inventors: Tsutomu Miyasato, Nara (JP);
Yasuyuki Sumi, Nara (JP); Noriaki Kuwahara, Nara (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 131 days.

(21) Appl. No.: 13/992,737

(22) PCT Filed: Dec. 26, 2011

(86) PCT No.: PCT/US2011/067314
§ 371 (c)(1),
(2), (4) Date: Jun. 8, 2013

(87) PCT Pub. No.: WO2013/100888
PCT Pub. Date: Jul. 4, 2013

(65) Prior Publication Data
US 2014/0195537 A1    Jul. 10, 2014

(51) Int. Cl.
*G06F 17/30*     (2006.01)
(52) U.S. Cl.
CPC ... *G06F 17/30038* (2013.01); *G06F 17/30705* (2013.01); *G06F 17/30867* (2013.01)
(58) Field of Classification Search
CPC .......................... G06F 17/30861; H04L 5/12
USPC .................................................. 707/705, 706
See application file for complete search history.

(56) References Cited

U.S. PATENT DOCUMENTS

| | | |
|---|---|---|
| 2005/0240580 A1 | 10/2005 | Zamir et al. |
| 2007/0039023 A1 | 2/2007 | Kataoka |
| 2007/0106663 A1* | 5/2007 | Rosenberg ........ G06F 17/30716 |
| 2008/0222105 A1 | 9/2008 | Matheny |
| 2009/0083237 A1 | 3/2009 | Gelfand et al. |
| 2009/0248666 A1* | 10/2009 | Ahluwalia ........ G06F 17/30864 |
| 2010/0070507 A1 | 3/2010 | Mori |
| 2012/0215805 A1* | 8/2012 | Homma et al. ............... 707/769 |
| 2013/0018968 A1* | 1/2013 | Pennacchiotti ........ G06Q 10/10 709/206 |
| 2014/0149399 A1* | 5/2014 | Kurzion ............ G06F 17/30867 707/723 |

OTHER PUBLICATIONS

Notification of Transmittal of the International Search Report and the Written Opinion of the International Searching Authority, PCT/US2011/067314, Aug. 17, 2012.

(Continued)

*Primary Examiner* — Baoquoc N To
(74) *Attorney, Agent, or Firm* — Ren-Sheng International

(57) ABSTRACT

Techniques for content providing and classifying users based on content search conditions are generally described. In some examples, the techniques may be embodied in apparatus, systems, and methods. An example content providing apparatus may include a receiving unit, a classifying unit, a content acquisition unit, and a determining unit. The receiving unit may be configured to receive content search conditions and the classifying unit may be configured to classify users into types according to the search conditions. The content acquisition unit may be configured to acquire content that includes non-text data based on the received search conditions and the determining unit may be configured to evaluate acquired content to identify data of the non-text data in the acquired content that is firstly processed to output based on the user type.

21 Claims, 12 Drawing Sheets

(56) References Cited

OTHER PUBLICATIONS

Andre Gueziec et al., "Simplicial Maps for Progressive Transmission of Polygonal Surfaces", IBM T.J.Watson Research Center, 1998, pp. 7.

Melissa Mackey, "Expand Your PPC Reach With Google's Interest-Based Advertising", SEW, Accessed at <URL: http://searchenginewatch.com/sew/news/2049098/expand-your-ppc-reach-with-googles-interest-based-advertising> on Dec. 12, 2014, posted on May 13, 2010, pp. 3.

* cited by examiner

| Word ID | Word | User Type | |
|---|---|---|---|
| 1 | roar | acoustic | |
| 2 | echo | acoustic | |
| 3 | drizzle | acoustic | |
| 4 | red | visual | color |
| 5 | angular | visual | shape |
| 6 | round | visual | shape |
| 7 | ...... | ...... | |
| 8 | ...... | ...... | |
| 9 | ...... | ...... | |
| 10 | ...... | ...... | |

FIGURE 6

| Word ID | Word | User Type | | Score |
|---|---|---|---|---|
| 1 | roar | acoustic | | 0.8 |
| 2 | echo | acoustic | | 0.8 |
| 3 | drizzle | acoustic | | 0.9 |
| 4 | bang | acoustic | | 1.0 |
| 5 | beep | acoustic | | 1.0 |
| 6 | ...... | ...... | | |
| 7 | ...... | ...... | | |
| 8 | red | visual | color | 0.9 |
| 9 | twinkle | visual | color | 1.0 |
| 10 | angular | visual | shape | 0.9 |
| 11 | round | visual | shape | 0.9 |
| 12 | cube | visual | shape | 1.0 |
| 13 | ...... | ..... | | |

FIGURE 9

CONTENT PROVIDING TECHNIQUES

CROSS-REFERENCE TO RELATED APPLICATION

The present application is a U.S. national stage filing under 35 U.S.C. §371 of International Application PCT/US2011/067314, filed on Dec. 26, 2011 and entitled "CONTENT PROVIDING TECHNIQUES." The International Application, including any appendices or attachments thereof, is incorporated by reference herein in its entirety.

BACKGROUND

Content search is widely performed for finding desired content. Generally, content search is conducted by a computing device via a communication network, such as the Internet, to find content on a network, or to find a place of a local file in the computing device. It is demanded that a content providing apparatus enables a user to find desired content effectively and quickly. Many content search services or applications are provided in the world.

Unless otherwise indicated herein, the materials described in this section are not prior art to the claims in this application and are not admitted to be prior art by inclusion in this section.

SUMMARY

The present disclosure generally describes a content providing apparatus. Some example content providing apparatuses may include one or more of a receiving unit, a classifying unit, a content acquisition unit, and/or a determining unit. The receiving unit may be arranged to evaluate content search conditions to identify received search conditions. The classifying unit may be arranged to classify users into types according to the received search conditions. The content acquisition unit may be operable to acquire content that includes non-text data based on the received search conditions. The determining unit may be operable to evaluate acquired content to identify data of the non-text data that is firstly processed in the acquired content to output based on the user type.

The present disclosure generally also describes some example methods including evaluating content search conditions to identify received search conditions, classifying users into types according to the received search conditions, acquiring content that includes non-text data based on the received search conditions, and evaluating acquired content to identify data of the non-text data that is firstly processed in the acquired content to output based on the user type.

Also described is a computer readable storage medium. Some example computer readable storage medium include contents that, when executed by a processor, may cause the processor to evaluate content search conditions to identify received search conditions, classify users into types according to the received search conditions, acquire content that includes non-text data based on the received search conditions, and evaluate acquired content to identify data of the non-text data that is firstly processed in the acquired content to output based on the user type.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 shows an example of a data structure in the word storing unit;

FIG. 9 shows another example of a data structure in the word storing unit;

DETAILED DESCRIPTION

Figure 1:
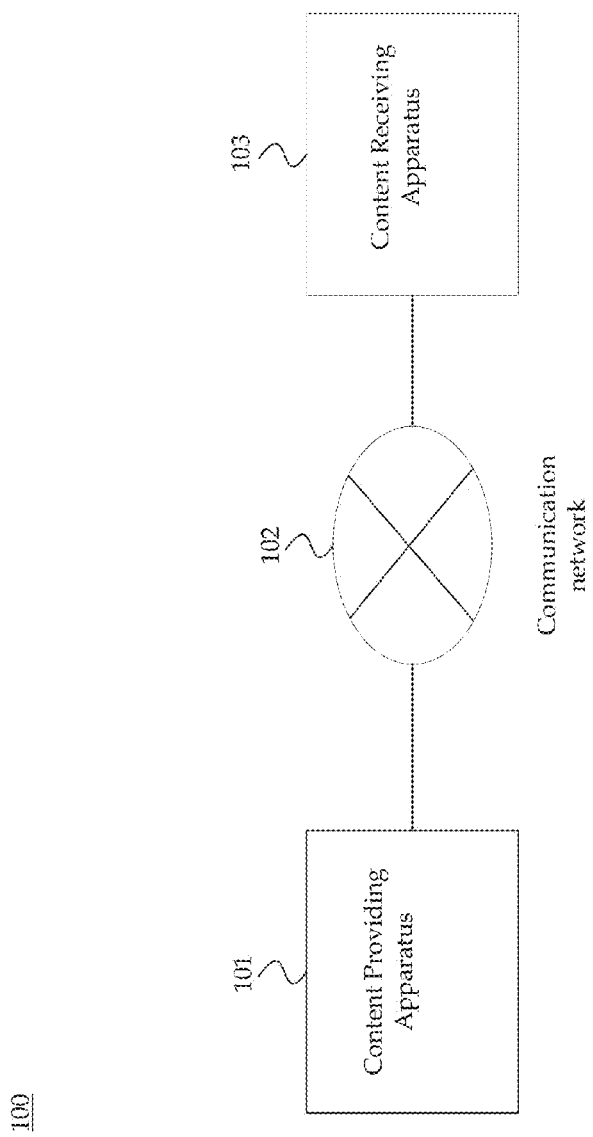
FIG. 1 is a schematic illustration of an example of a content providing system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to content providing apparatus with classifying user and, more particularly, to firstly output data in the content corresponding to user type based on the content search conditions.

Briefly stated, examples of content providing apparatuses with classifying user are generally described. The content providing apparatus may include a receiving unit, a classifying unit, a content acquisition unit, and a determining unit. The receiving unit may be configured to receive content search conditions and the classifying unit may be configured to classify users into types according to the search conditions. The content acquisition unit may be configured to acquire content that includes non-text data based on the received search conditions and the determining unit may be configured to evaluate acquired content to identify data of the non-text data that is firstly processed in the acquired content to output based on the user type.

In this disclosure, the term "content" may refer to multimedia data represented by one or more of signals of music, images, video, data files, and web pages including text, images, audio, and/or video.

FIG. 1 is a schematic illustration of an example of a content providing system 100 arranged in accordance with at least some embodiments of the present disclosure. The content providing system 100 may include a content providing apparatus 101, a communication network 102, and a content receiving apparatus 103. The content providing apparatus 101 may be configured to: receive a content search request including content search conditions, initiate a content search based on the content search conditions, and provide content search results. The content receiving apparatus 103 may be configured to send the content search request with the content search conditions to the content providing apparatus 101 via the communication network 102, and may also be configured to receive and display the content search results or contents from the content providing apparatus 101 via the communication network 102. The communication network 102 can be adapted to various objects corresponding to a connection method between the content providing apparatus 101 and the content receiving apparatus 103, such as the Internet and LAN.

Figure 2:
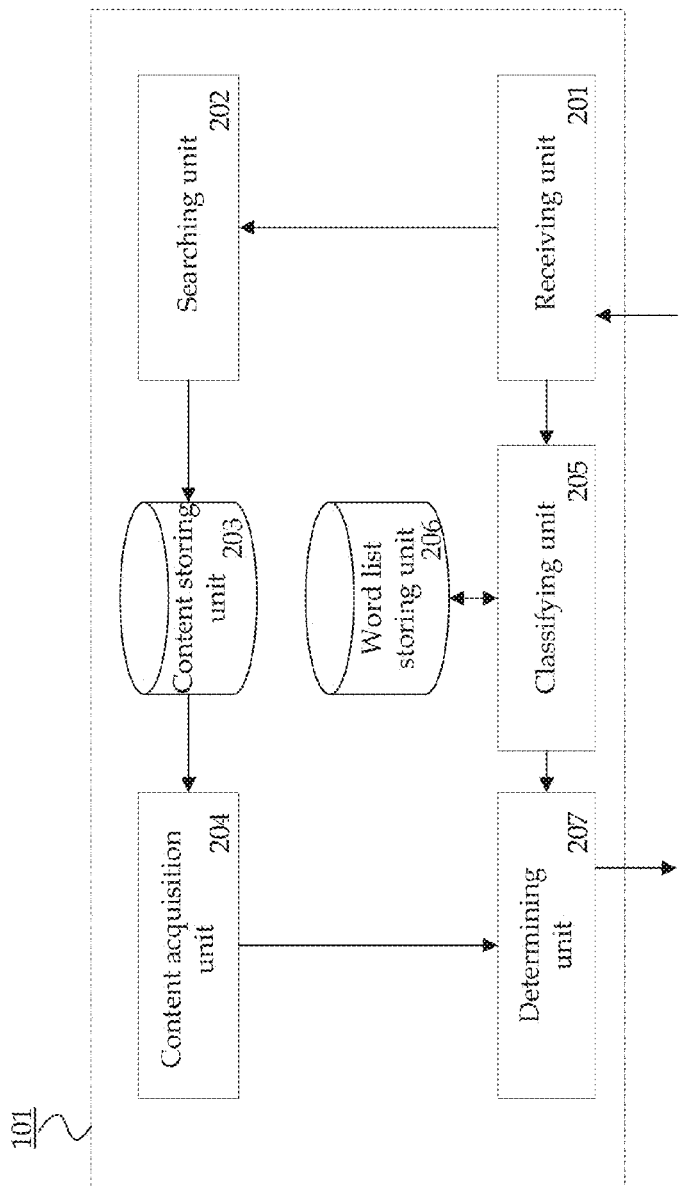
FIG. 2 is a block diagram of an example content providing apparatus.

FIG. 2 is a block diagram of an example content providing apparatus 101 that is arranged according to various examples of the present disclosure. The content providing apparatus may include functional and/or physical portions as follows: a receiving unit 201, a searching unit 202, a content storing unit 203, a content acquisition unit 204, a classifying unit 205, a word list storing unit 206, and/or a determining unit 207. Although illustrated as discrete portions, the various functions and/or physical partitions are merely examples, and the various functions and/or physical partitions can be separated into additional portions, combined into fewer portions, or eliminated based on the specific requirements of the implementation.

The receiving unit 201 may be configured to receive content search conditions, such as keywords and sentences, from a content receiving apparatus (e.g., content receiving apparatus 103 of FIG. 1). The searching unit 202 may be configured to initiate and/or process searches of content based on the content search conditions received by the receiving unit 201. The content storing unit 203 can be configured to manage content that can be searched by the searching unit 202. In some examples, the content storing unit 203 may be configured to register content to a corresponding content ID. Alternatively, the content storing unit 203 can be configured to store content metadata instead of content. The content metadata can be any variety of metadata associated with accessing content such that the metadata may contain one or more of a URL, keywords, a summary of the content etc. The content acquisition unit 204 may be configured to collect and acquire one or plural contents as the content searching result for providing to the content receiving apparatus 103. In case the content acquisition unit 204 acquires plural contents, a list of the contents may be generated. When the list of the contents is provided as the providing content to the content receiving apparatus 103, the providing content may contain links to access content. The user can acquire a desired content by selecting one or more of these links (e.g., by moving a cursor of a mouse device and activating the selection with a button). Any known method for searching and acquiring contents can be applied to this disclosure.

A classifying unit 205 may be adapted to classify a user who requests a content search by sending content search conditions for receipt by the receiving unit 201. The classifying unit 205 may be configured to perform morphological analysis on keywords or sentences of content search conditions. The user can be classified by dominant sense, such as visual dominant type and acoustic dominant type, based on the content search conditions. The word list storing unit 206 may be configured to manage word list data in which words are registered corresponding to user dominant type. The classifying unit 205 may refer word list data in the word list storing unit 206 for determining a user dominant type.

The determining unit 207 may be configured to evaluate acquired content to identify data of the non-text data that is firstly processed in the acquired content for outputting (i.e. displaying or playing) in accordance with the user dominant type. In case a user is classified into an acoustic dominant type by the classifying unit 205, the determining unit 207 may determine audio data to be firstly processed in the content for playing the audio data.

Figure 3:
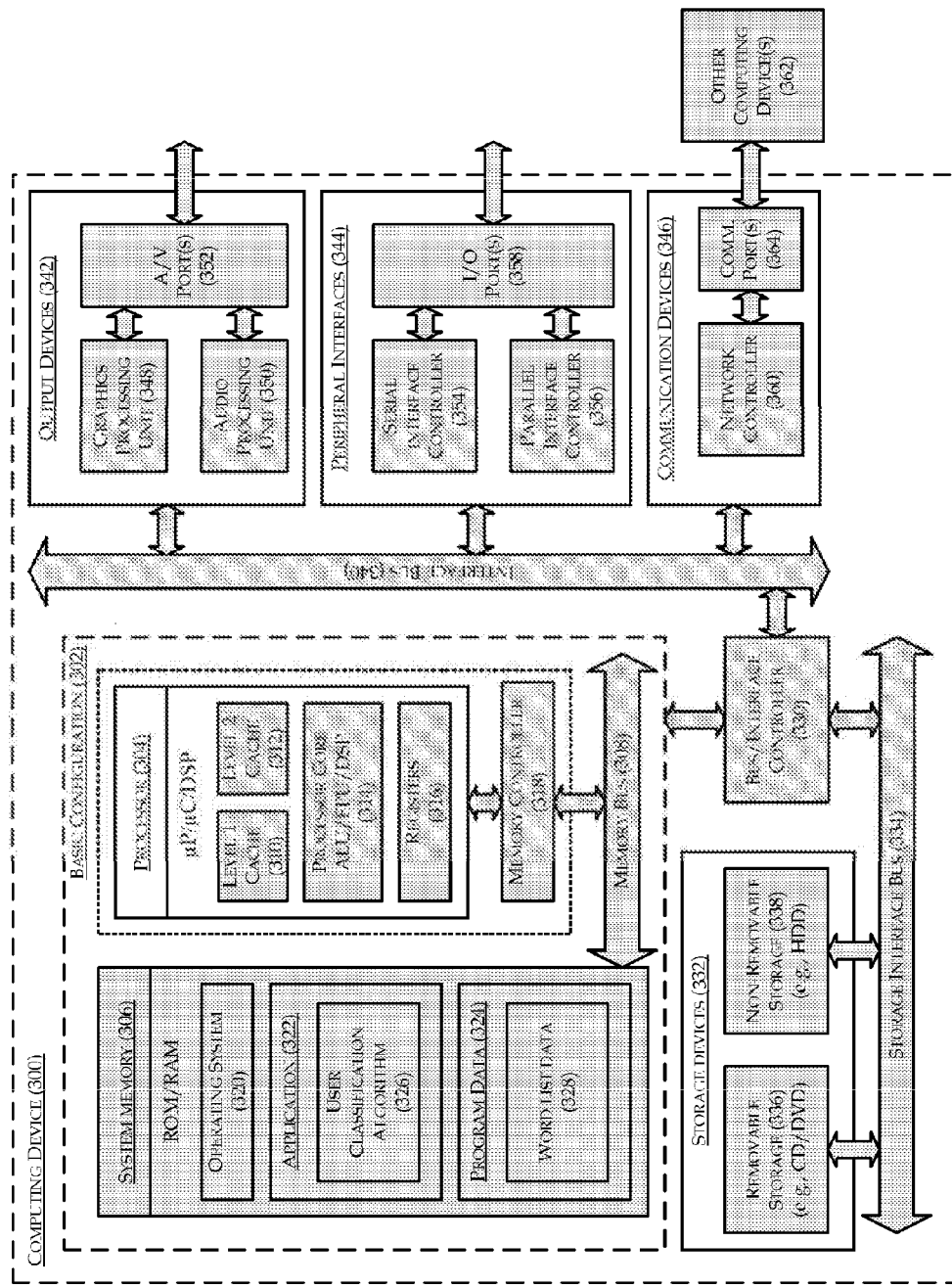
FIG. 3 is a block diagram illustrating an example computing device that is configured as a content providing apparatus.

FIG. 3 is a block diagram illustrating an example computing device 300 that is configured as a content providing apparatus in accordance with the present disclosure. In a very basic configuration 302, computing device 300 typically includes one or more processors 304 and a system memory 306. A memory bus 308 may be used for communicating between processor 304 and system memory 306.

Depending on the desired configuration, processor 304 may be of any type including but not limited to a microprocessor (µP), a microcontroller (µC), a digital signal processor (DSP), or any combination thereof. Processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), nonvolatile memory (such as ROM, flash memory, etc.) or any combination thereof. System memory 306 may include an operating system 320, one or more applications 322, and program data 324. Application 322 may include a user classification algorithm 326 that is arranged to classify users based on the content search conditions for determining first processing data. Program data 324 may include word list data 328 that may be useful for classifying users based on words in the content search conditions as is described herein. In some embodiments, application 322 may be arranged to operate with program data 324 on operating system 320 such that first processing data may be determined. This described basic configuration 302 is illustrated in FIG. 3 by those components within the inner dashed line.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations.

Figure 4:
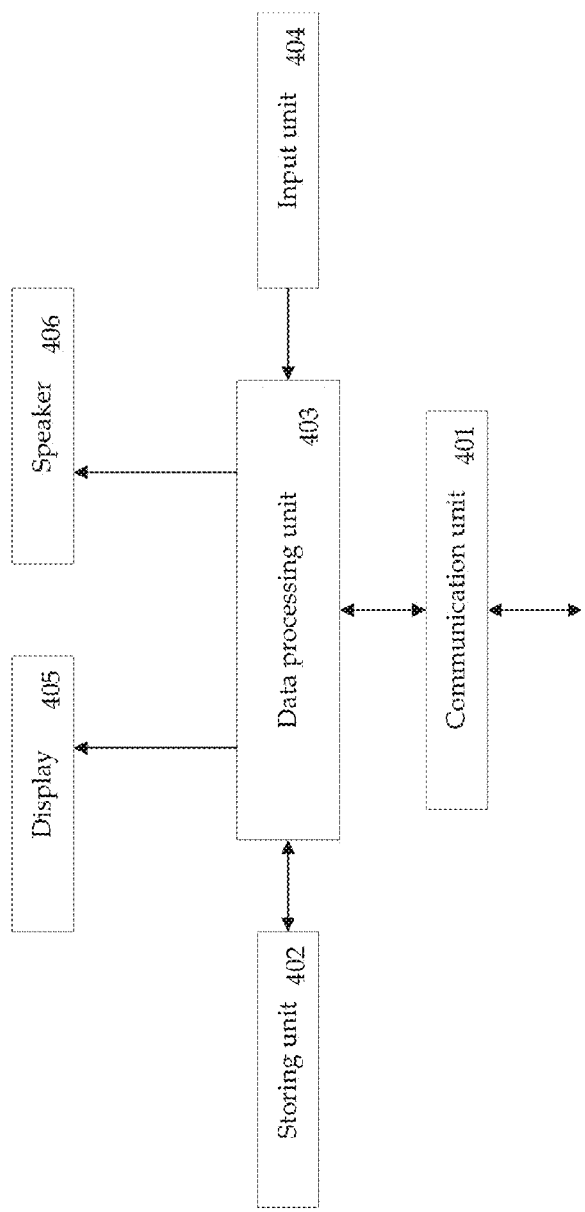
FIG. 4 is a block diagram of an example content receiving apparatus.

FIG. 4 is a block diagram of an example content receiving apparatus arranged according to various examples of the present disclosure. The content receiving apparatus 103 may include a communication unit 401, a storing unit 402, a data processing unit 403, an input unit 404, a display 405, and a speaker 406. The communication unit 401 may be configured to communicate with the content providing apparatus 101 via a communication network. The storing unit 402 may be adapted to store contents received from the content providing apparatus 101. The storing unit 402 may include any variety of non-removable storage, such as HDD, any variety of removable storage, such as CD and DVD, or any variety of memory. A data processing unit 403 may be adapted to control the communication unit 401, the storing unit 402, the input unit 404, the display 405, and the speaker 406. The data processing unit 403 may process data in content for displaying on the display 405 or putting (e.g., sending an electrical signal) on the speaker 406. Any processor, such as a microprocessor and a microcontroller, can be applied to the data processing unit 403. The input unit 404 may include a keyboard, a mouse, a touch screen, a microphone, or a pointing device etc.

Figure 5:
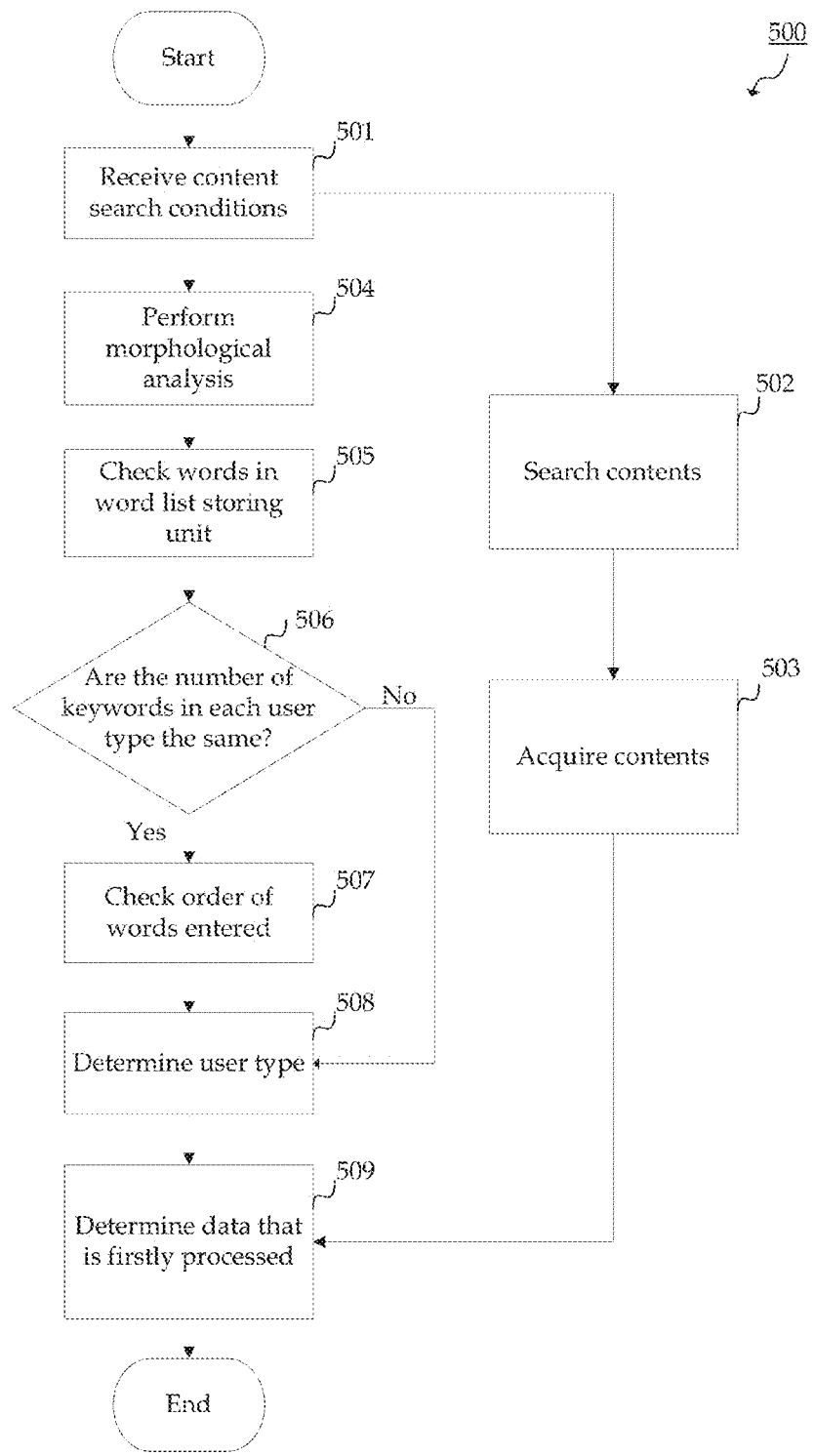
FIG. 5 shows an example of a flow diagram for a process of determining data that is firstly processed to output.

FIG. 5 shows an example of a flow diagram for a process 500 of determining data that is firstly processed to output according to the first embodiment of the present disclosure. Process 500 may include one or more operations, functions, or actions as illustrated by blocks 501 through 509. Although illustrated as discrete blocks 501-509, the various blocks are illustrative partitions in an example process. The example process 500 may begin at block 501.

At block 501 (Receive content search conditions), the receiving unit 201 may be configured to receive content search conditions from the content receiving apparatus 103. The content search conditions can be keywords, phrases or sentences associated with the desired content. Block 501 may be followed by block 502 and/or block 504.

At block 502 (Search contents), the searching unit 202 may be adapted to search contents that are stored in the content storing unit 203. The search objects may include web pages, audio data and video data so that acquired content may have both text and non-text data. Block 502 may be followed by block 503.

At block 503 (Acquire contents), the content acquisition unit 204 may be adapted to acquire content relating to the search conditions. Block 503 may be followed by block 509.

At block 504 (Perform morphological analysis), the classifying unit 205 may be adapted to perform morphological analysis on the content search conditions to determine user dominant sense. Block 504 may be followed by block 505.

At block 505 (Check words in word list storing unit), after completing the morphological analysis, the classifying unit 205 may be adapted to refer word list data in the word list storing unit 206 to classify user into dominant sense based on words in the content searching conditions. Block 505 may be followed by block 506.

At block 506 (Are the number of keywords in each user type the same?), the classifying unit 205 may be configured to refer the word list storing unit 206, and to determine user type based on the number of keywords in each user type. Generally, users can enter more than one keyword so that user type can be determined by a simple majority decision in this embodiment. The classifying unit 205 may be configured to analyze whether the number of keywords in each user type are substantially the same. Block 506 may be followed by block 507 and/or block 508.

At block 507 (Check order of words entered), the classifying unit 205 may be adapted to check the order of words entered if the number of acoustic keywords is substantially the same as the number of visual keywords. The order of word entry may be time order. Block 507 may be followed by block 508.

At block 508 (Determine user type), the determining unit 207 may be adapted to determine the user type. The user type can be determined by the type of the keyword which is entered at the end (the latest keyword). Alternatively, the user type can be determined by the majority type of the last three keywords. The classifying unit 205 may be adapted to determine user type by the simple majority decision if the number of keywords in each user type is not substantially the same. If the number of acoustic keywords is greater than the number of the visual keywords, user type may be determined to be the acoustic dominant type. If the number of visual keywords is greater than the number of the acoustic keywords, then the classifying unit may be adapted to determine whether the user is the shape-dominant visual type or the color-dominant visual type by a simple majority decision. In case the number of the color-dominant keywords is substantially the same as the number of the shape-dominant keywords, the user type may be determined by the order of the word entry. Block 508 may be followed by block 509.

At block 509 (Determine data that is firstly processed), the determining unit 207 may be adapted to receive the user type from the classifying unit 205, and the providing content from the content acquisition unit 204. The determining unit 207 can be adapted to evaluate acquired content to identify data that is firstly processed in the providing content based on the user type. The providing content to the content receiving apparatus 103 can be a webpage or multimedia data including non-text data, such as images, video, and audio. Therefore the determining unit 207 may be adapted to identify which non-text data signals are given priority for processing to output based on the user type. If the user type is the acoustic dominant type, audio data may be given a higher priority to be firstly processed to output (e.g. playing the audio data on an audio output device such as a speaker, headphones, etc.). If the user type is the visual dominant type, image processing is given priority over other data processing to output. This priority information may be sent with content search result to the content receiving apparatus 103. If the user type is either shape-dominant or color-dominant of the visual type, the content providing apparatus 101 may also send information indicating area of colors and shapes in the image data for display processing. In case of a HTML document, a source of the HTML document contains a tag indicating data type, such as text and images. An example image tag is 'IMG src="images/header/access.gif" alt="Link to access map" name="access". 'src=" "' is for displaying image files, 'alt=" "' is text for situations where the image cannot be displayed)', and \'name=" "' indicates the name of the image file. Therefore, when the HTML document which is the providing content to the content receiving apparatus contains plural images, the determining unit 207 may be adapted to give a higher priority to one image data which has a tag corresponding to a word in the content searching conditions.

One skilled in the art will appreciate that, for this and other example processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 6 shows an example of a data structure in a word storing unit arranged according to at least some examples of the present disclosure. In some examples, the word storing unit may correspond to word storing unit 206 of FIG. 2.

Users can be classified into acoustic or visual dominant type. However, users also can be classified into smell, or any other senses. In the word list storing unit 206, words can be stored corresponding to a word ID and a user dominant type. The word list may be made based on the results of determining whether each word is an acoustic or visual word, through subjective assessment experiments of test subjects. If the user includes words regarding to sounds or onomatopoeia in searching conditions, the user is determined to be the acoustic dominant type. Acoustic words can be related to sounds, such as "echo", "roar", and "drizzle". On the other hand, shape dominant type can be further classified into the color dominant type or the shape dominant type. If the user includes words regarding to shapes, such as "angular" and "round", the user is determined to be the shape-dominant visual type. In the same manner, if the user includes a word regarding to color or ideophone, such as "red" and "twinkle", the user is determined to be the color-dominant visual type. The word list storing unit 206 may store these words.

Figure 7:
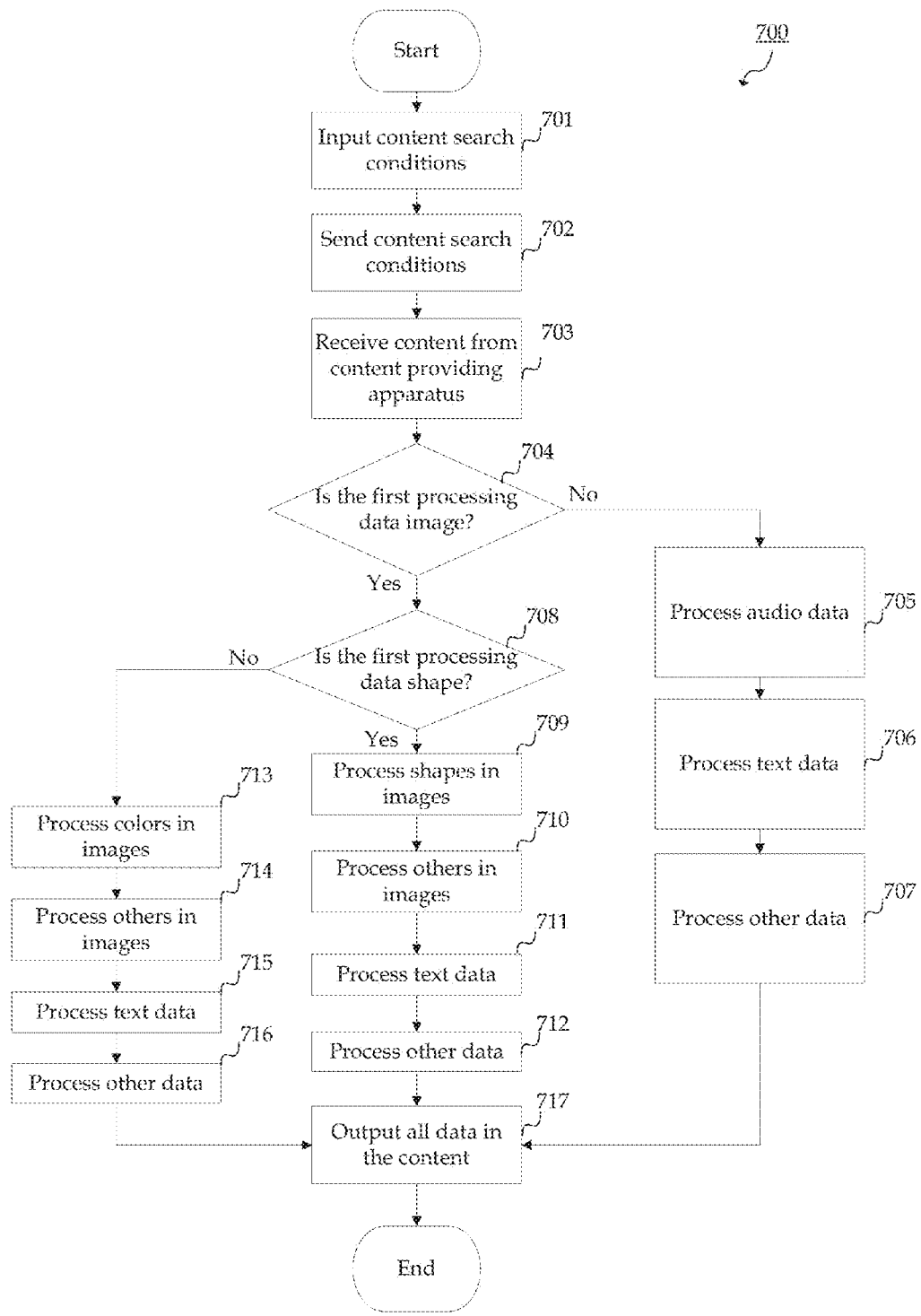
FIG. 7 shows a flow diagram for a process of data processing in an example content receiving apparatus.

FIG. 7 shows an example of flow diagram for a process 700 of data processing in an example content receiving apparatus arranged according to various examples of the present disclosure. Process 700 may include one or more operations, functions, or actions as illustrated by blocks 701 through 717. Although illustrated as discrete blocks 701-717, the various blocks are illustrative partitions in an example process. The example process 700 may begin at block 701.

At block 701 (Input content search conditions), the input unit 404 may be configured to input (or receive) content search conditions, such as keywords, phrases, and/or sentences. Block 701 may be followed by block 702.

At block 702 (Send content search conditions), the content search conditions may be sent (e.g., transmitted or communicated) as a content search request to the content providing apparatus 101 by the communication unit 401. Block 702 may be followed by block 703.

At block 703 (Receive content from content providing apparatus), the communication unit 401 may be adapted to receive content from the content providing apparatus 101 in response to the content search conditions. The received content may contain the priority information indicating data that is firstly processed for output. Block 703 may be followed by block 704.

At block 704 (Is the first processing data image?), the data processing unit 403 may be adapted to determine whether the first processing data is image data based on the priority information. If the priority information indicates the visual dominant type, the data processing unit 403 may be adapted to determine the first processing data is an image. If the priority information indicates the acoustic dominant type, the data processing unit 403 may be adapted to determine the first processing data is audio data. Block 704 may be followed by block 705 and/or 708.

At block 705 (Process audio data), the data processing unit 403 may be adapted to firstly process audio data in the received content data for playing (e.g., communicating audio data to an audio playback device such as a speaker, headphones, etc.), if the first processing data is audio data. Block 705 may be followed by block 706.

At block 706 (Process text data), the data processing unit 403 may be adapted to process text data for output (e.g., transmitting an electrical signal to a display). Block 706 may be followed by block 707.

At block 707 (Process other data), the data processing unit 403 may be adapted to process other data for output (e.g., transmitting an electrical signal to a display), such as image data. In this disclosure, second processing data is text, however second processing data can be any kind of data except for the audio data. Block 707 may be followed by block 717.

At block 708 (Is the first processing data shape?), the data processing unit 403 may be adapted to determine whether the first processing data is shape data in image data based on the priority information. If the priority information indicates shape-dominant of the visual type, the data processing unit 403 may be adapted to process shape data (e.g., transmitting an electrical signal to a display) for displaying shape in the image data. If the priority information indicates color-dominant of the visual type, the data processing unit 403 may be adapted to determine color data in the image data as the first processing data. Block 708 may be followed by block 709 and/or block 713.

At block 709 (Process shapes in images), the data processing unit 403 may be adapted to firstly process shape data in the image data. In an example embodiment, the image data may include shape data so that the data processing unit 403 may be adapted to firstly process the shape data to display shaped objects in the image data. In another embodiment, the data processing unit 403 may be adapted to detect edge in image data for displaying shaped object. In another embodiment, the data processing unit 403 may be adapted to output black and white image data or gray scale image data to the display 405. Block 709 may be followed by block 710.

At block 710 (Process others in images), the data processing unit 403 may be adapted to process other data in the image data. All of the data in the image data may be processed for output on the display 405 as all the image data is processed sufficient to be output. Block 710 may be followed by block 711.

At block 711 (Process text data), the data processing unit 403 may be adapted to process text data in the content for output (e.g., transmitting an electrical signal to a display). Block 711 may be followed by block 712.

At block 712 (Process other data), the data processing unit 403 may be adapted to process other data in the content (e.g., transmitting an electrical signal to a display and/or an audio playback device, such as a speaker, headphone etc.,). Other data may be audio data and/or text data. Block 712 may be followed by block 717. The data processing unit 403 may use the received information indicating area of colors and shapes in the image data to process the image data.

At block 713 (Process colors in images), the data processing unit 403 may be adapted to process color data in the image data firstly. In one embodiment, the data processing unit 403 may be adapted to process the image data to display with relatively low color depth, such as 4-bit or 8-bit color even though the image data has full color, such as 32-bit color. In another embodiment, the data processing unit 403 may be adapted to process the image data to display low-resolution image, such as a preview of progressive JPEG format image data or interlaced GIF format image data. Block 713 may be followed by block 714.

At block 714 (Process others in images), the data processing unit 403 may be adapted to process other data in the image data. In one embodiment, the data processing unit 403 may be adapted to process the image data sufficiently to display the image data having full color, such as 32-bit color. In another embodiment, the data processing unit 403 may be adapted to process the image data to display sufficient resolution images. The block 714 may be followed by block 715.

At block 715 (Process text data), the data processing unit 403 may be adapted to process text data for output (e.g., transmitting an electrical signal to a display). The block 715 may be followed by block 716.

At block 716 (Process other data), the data processing unit 403 may be adapted to process other data in the content for output (e.g., transmitting an electrical signal to a display and/or an audio playback device, such as a speaker, headphone etc,). Other data may be audio data and/or text data. The block 716 may be followed by block 717.

At block 717 (Output all data in the content), all of the data in the received content may be output (e.g., communicated or sent to) on the display 405 and/or speaker 406 as all the data in the content is processed sufficient to be output.

This processing order may be kept for processing data after the providing content is displayed and played. For example, in case of providing a list of content, a user may choose one by clicking (e.g., selecting with a user selection device such as a mouse) a link, then the link of content can be displayed. When the link of content is displayed, the processing order may be kept for processing the same as the list of content which is the first providing content. Alternatively, the data processing unit 403 may be adapted to store and keep the order for processing data even after finishing the content search.

In case the received content is an HTML document, the data processing unit 403 may be adapted to check tags representing data type, such as text and images for changing the order of tag processing. When the first processing data is image, the data processing unit 403 may be adapted check a tag corresponding to the content search conditions based on the priority information, and may process firstly an image having the tag. Other images in the received content may not be processed for displaying, or may be replaced with other image data with a smaller file size to notify that the display of the image may be delayed, or the IMG tag may be changed into a comment.

Alternatively, if the content providing apparatus 103 doesn't have any abilities to distinguish color from shapes for display processing, or if there is no information for extracting colors or images from image data, image data in the content may be simply processed in case of the visual dominant type.

If a multi-core processor is applied to the data processing unit 403, priority data can be firstly allocated to the core processors for processing data. When image data is given priority for display processing, and the number of image data is greater than N (N is the number of core processors), the image data are firstly allocated to the core processors. When the number of image data is less than N, the rest of core processors are allocated for processing other data, such as text and audio data.

Figure 8:
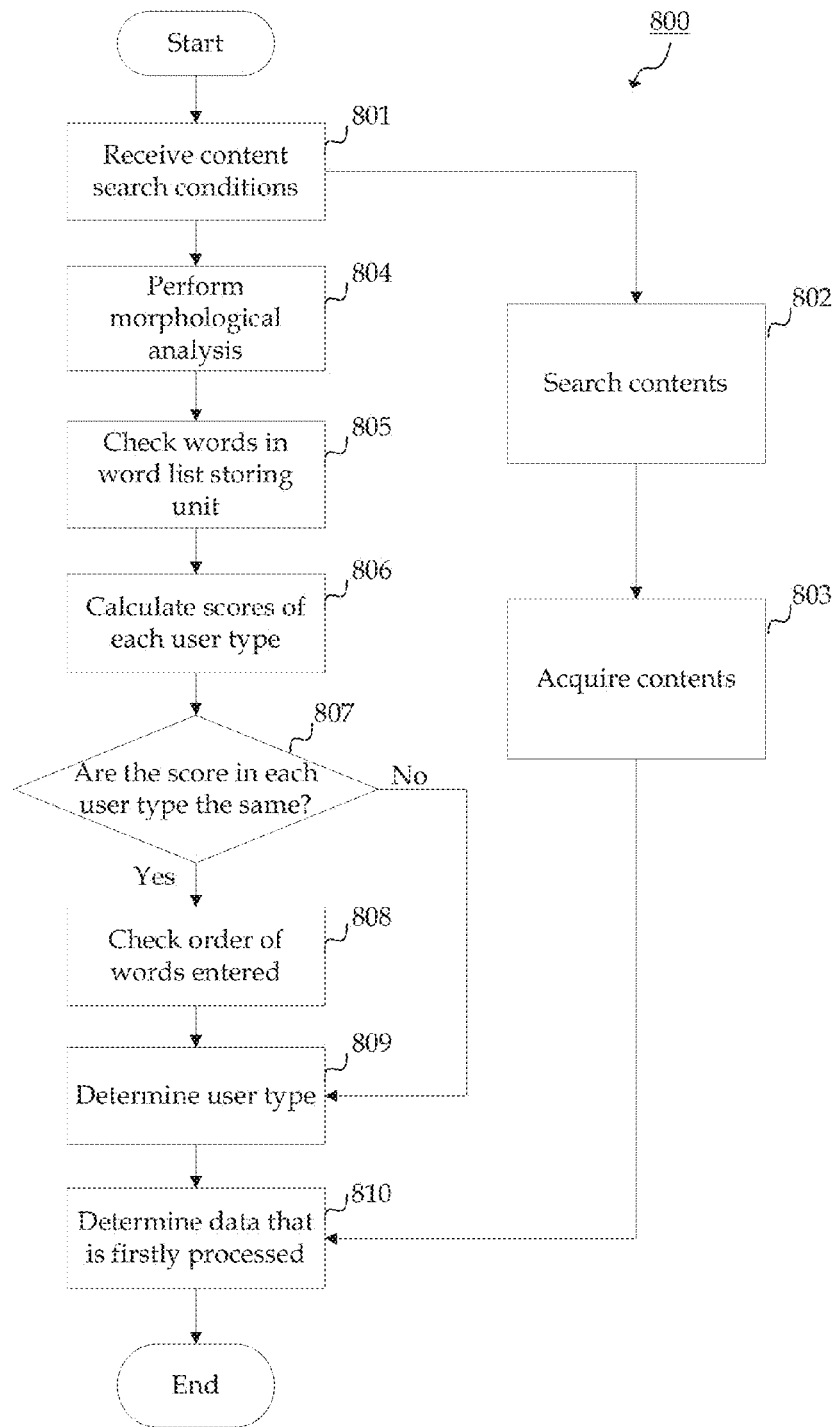
FIG. 8 shows another example of a flow diagram for determining processing data.

FIG. 8 shows another example of a flow diagram 800 for determining processing data in accordance with various examples described herein. The flow diagram 800 may include one or more operations, functions, or actions as illustrated by blocks 801 through 810. Although illustrated as discrete blocks 801-810, the various blocks are illustrative partitions in an example process. The example process 800 may begin at block 801.

At block 801 (Receive content search conditions), the receiving unit 201 may be configured to receive content search conditions from the content receiving apparatus 103. Block 801 may be followed by block 802 and/or block 804.

At block 802 (Search contents), the searching unit 202 may be adapted to search contents that are stored in the content storing unit 203 using the received search conditions from block 801. Block 802 may be followed by block 803.

At block 803 (Acquire contents), the content acquisition unit 204 may be adapted to acquire content relating to the search conditions from the searching unit 202. Block 803 may be followed by block 810.

At block 804 (Perform morphological analysis), the classifying unit 205 may be adapted to perform morphological analysis on the content search conditions from block 801 to determine a user dominant sense. Block 804 may be followed by block 805.

At block 805 (Check Words in Word List Storing Unit), after completing the morphological analysis, the classifying unit 205 may be adapted to evaluate word list data in the word list storing unit 206 to classify a user into a dominant sense based on the words identified with the content searching conditions. Block 805 may be followed by block 806.

At block 806 (Calculate scores of each user type), the classifying unit 205 may be adapted to calculate scores of each user type based on the words in the content searching conditions. In one embodiment, if words in content searching conditions are "roar red lion echo", the classifying unit 205 may be adapted to refer the word list data in the word list storing unit 206. In the word list data, "roar" may be stored with "acoustic" and "0.8". The "acoustic" may indicate user dominant type, and the "0.8" may indicate a score. In the same manner, "red" may be stored with "visual color" and "0.9", and "echo" may be stored with "acoustic" and "0.8" in the word list storing unit 206. The classifying unit 205 may be adapted to add scores in substantially the same user dominant type. In this case, the score of the "acoustic" may be calculated as 1.6, and the score of the "visual color" may be calculated as 0.9. Block 806 may be followed by block 807.

At block 807 (Are the score in each user type the same?), the classifying unit 205 may be adapted to analyze whether the scores in each user type are substantially the same. Block 807 may be followed by block 808 and/or block 809.

At block 808 (Check order of words entered), the classifying unit 205 may be adapted to check the order of words entered when the score of the acoustic dominant type is determined to be substantially the same as the score of the visual dominant type. The order of word entry may be time order. Block 808 may be followed by block 809.

At block 809 (Determine user type), the user type can be determined by the type of the keyword which is entered at the end (the latest keyword) by the classifying unit 205 when the score of the acoustic dominant type is determined to be substantially the same as the score of the visual dominant type. Alternatively, the user type can be determined by the majority type of the last three keywords. The classifying unit 205 may be adapted to determine user type by the simple majority decision when the scores of each user type are not substantially the same. If the score of acoustic dominant type is greater than the score of visual dominant type, is the user type may be determined to be the acoustic dominant type. If the score of visual dominant type is greater than the score of acoustic dominant type, then the classifying unit 205 may be adapted to determine whether the user is the shape-dominant visual type or the color-dominant visual type by a weighted decision. In case the score of the color-dominant type is substantially the same as the score of the shape-dominant type, the user type may be determined by the order of the word entry. Block 809 may be followed by block 810.

At block 810 (Determine data that is firstly processed), the determining unit 207 may be adapted to receive the user type from the classifying unit 205, and also receive the content from the content acquisition unit 204. The determining unit 207 can be adapted to determine which data is to be processed first in the content based on the user type.

FIG. 9 shows another example of a data structure in the word storing unit 206 arranged according to various embodiments of the present disclosure. In the word storing unit 206, words are stored corresponding to a word ID, a user dominant type, and a score. The score may be assigned as the relative frequency (0.0 to 1.0) of the number of decisions made compared to the total number of test subjects. Onomatopoeia (such as "bang" and "beep") and ideophones (such as "twinkle") have a weight of 1.0.

Figure 10:
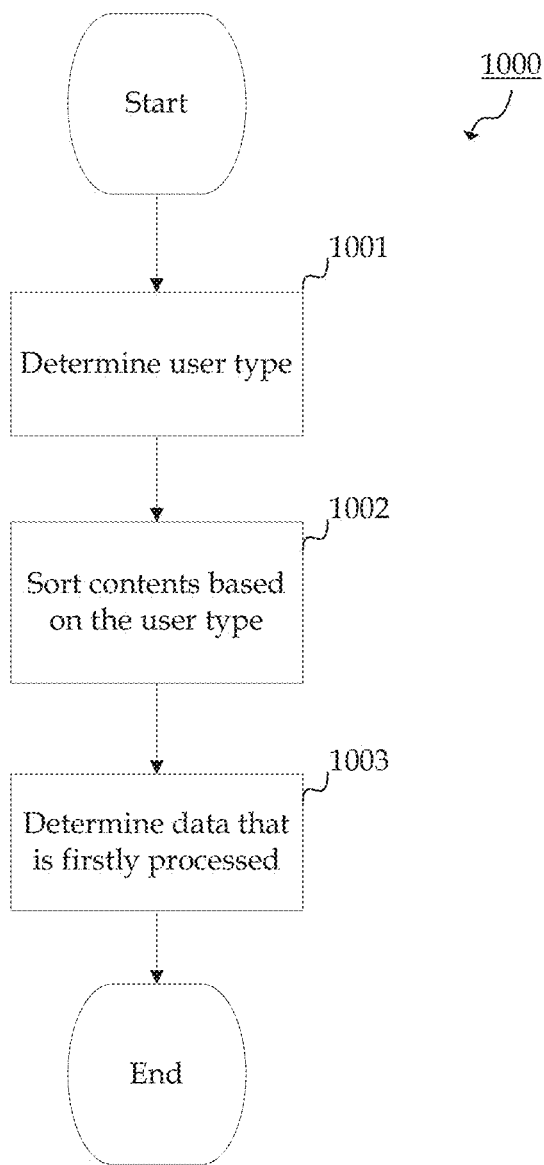
FIG. 10 shows a further example of a flow diagram in the content providing apparatus.

FIG. 10 shows a further example of a flow diagram 1000 in the content providing apparatus 101, arranged according to various embodiments of the present disclosure. The flow diagram 1000 may include one or more operations, functions, or actions as illustrated by blocks 1001 through 1003. Although illustrated as discrete blocks 1001-1003, the various blocks are illustrative partitions in an example process. The example process 1000 may begin at block 1001.

At block 1001 (Determine user type), the classifying unit may be adapted to determine the user type based on the words identified in the content searching conditions. Block 1001 may be followed by block 1002.

At block 1002 (Sort contents based on the user type), a list of contents may be sorted by user type when the determining unit 207 receives a list of contents from the content acquisition unit 204. If the user type is the acoustic dominant type, the content including audio data can be listed at the top of the sorted list. If the user type is the visual dominant type, the content including image data can be listed at the top of the sorted list. The list of contents data from the content acquisition unit 204 may contain data which indicates content having images and/or audio corresponding to the listed content so that the determining unit 207 can be adapted to sort the list based on the user type. Block 1002 may be followed by block 1003.

At block 1003 (Determine data that is firstly processed), the determining unit 207 may be configured to determine which data is to be processed first in the providing content based on the user type.

Figure 11:
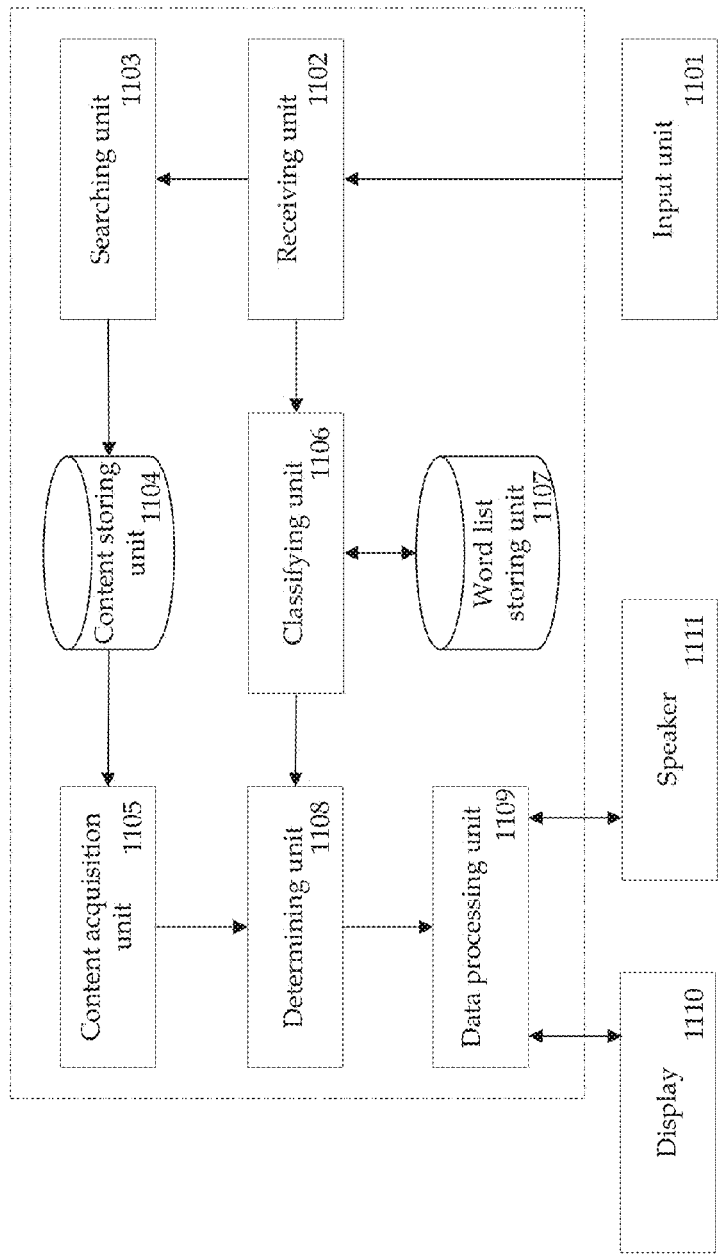
FIG. 11 is a block diagram of an example content providing apparatus.

FIG. 11 is a block diagram of an example content providing apparatus arranged in accordance with various embodiments of the present disclosure. In this embodiment, the content providing apparatus may be composed of an integrated combination of the content providing apparatus 101 and the content receiving apparatus 103 in FIG. 1. Content may correspond to local data files stored in the content providing apparatus 1100. This embodiment is an example of the present disclosure applied to the content providing apparatus 1100. The content providing apparatus 1100 may contain one or more of a receiving unit 1102, a searching unit 1103, a content storing unit 1104, a content acquisition unit 1105, a classifying unit 1106, a word list storing unit 1107, a determining unit 1108, and/or a data processing unit 1109.

The receiving unit 1102 may be configured to receive content search conditions from an input unit 1101. The searching unit 1103 may be configured to search contents based on the content search conditions received by the receiving unit 1102. The content storing unit 1104 may be configured to manage contents which can be searched by the searching unit 1103. The content storing unit 1104 may be configured to store content metadata instead of content. A content acquisition unit 1105 may be configured to collect and acquire one or plural contents as the content searching result based on the content searching conditions. In case the content acquisition unit 1105 acquires plural contents, a list of the contents may be generated. When the list of the contents is provided, the providing content may contain links to access content. The user can acquire a desired content by selecting one or more of these links (e.g., by moving a cursor of a mouse device and activating the selection with a button). Any known method for searching and acquiring contents can be applied to this disclosure.

A classifying unit 1106 may be adapted to classify a user who requests a content search by inputting or sending content search conditions. The classifying unit 1106 may be further adapted to perform morphological analysis on keywords or sentences of content search conditions. The user can be classified by dominant sense, such as visual dominant type and acoustic dominant type, based on the content search conditions. A word list storing unit 1107 may be configured to manage word list data in which words are registered corresponding to user dominant sense. The classifying unit 1106 may be configured to refer word list data in the word list storing unit 1107 for determining a user dominant type. The determining unit 1108 may be adapted to determine data that is firstly processed in the providing content for displaying or playing in accordance with the user dominant type. In case a user is classified into an acoustic dominant type by the classifying unit 1106, the determining unit 1108 may determine audio data in the content to be firstly processed for playing the audio data.

A data processing unit 1109 may be configured to process received data associated with the provided content such that the provided content can be effectively displayed on a display 1110 or transmitted via a speaker 1111 in accordance with the determination made by the determination unit 1108.

Figure 12:
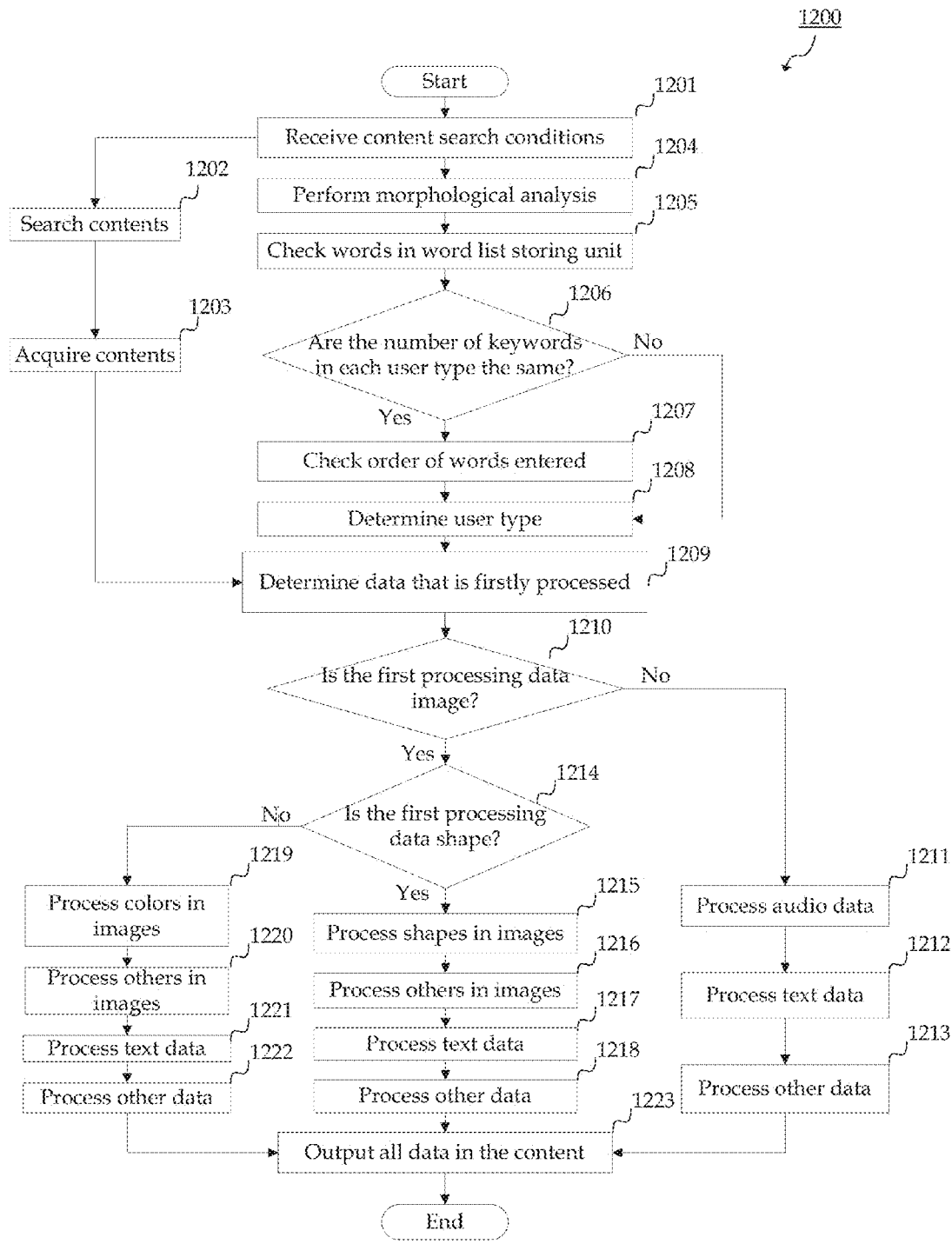
FIG. 12 is an example flowchart for a process of various processing operations in an example content providing apparatus, all arranged in accordance with at least some embodiments of the present disclosure.

FIG. 12 is an example flowchart for a process 1200 of various processing operations in an example content providing apparatus that is arranged in accordance with various embodiments described herein. Process 1200 may include one or more operations, functions, or actions as illustrated by blocks 1201 through 1223. Although illustrated as discrete blocks 1201-1223, the various blocks are illustrative partitions in an example process. The example flowchart 1200 may begin at block 1201. In some examples, the content providing apparatus may be configured as is illustrated by apparatus 1100 in FIG. 11.

At block 1201 (Receive content search conditions), the receiving unit 1102 may be adapted to receive content search conditions from the input unit 1101. Block 1201 may be followed by block 1202 and/or block 1204.

At block 1202 (Search contents), the searching unit 1103 may be adapted to search contents in the content storing unit 1104 based on the content search conditions. Block 1202 may be followed by block 1203.

At block 1203 (Acquire contents), the content acquisition unit 1105 may be adapted to acquire content relating to the search conditions. Block 1203 may be followed by block 1209.

At block 1204 (Perform morphological analysis), the classifying unit 1106 may be adapted to perform morphological analysis on the content search conditions to determine user dominant sense. Block 1204 may be followed by block 1205.

At block 1205 (Check words in word list storing unit), the classifying unit 1106 may be adapted to evaluate word lists in the word list storing unit 1107 to classify a user into a dominant sense based on the words identified with the content searching conditions. The word list storing unit 1107 may be configured to store a word list as shown in FIG. 6. The classifying unit 1106 may be adapted to determine a user type based on the number of keywords in each user type by a simple majority decision. Block 1205 may be followed by block 1206.

At block 1206 (Are the number of keywords in each user type the same?), the classifying unit 1106 may be adapted to analyze whether the number of keywords in each user type are substantially the same. Block 1206 may be followed by block 1207 and/or block 1208.

At block 1207 (Check order of words entered), the classifying unit 1106 may be adapted to check the order of words entered when the number of acoustic keywords is substantially the same as the number of visual keywords. The order of word entry may be time order. Block 1207 may be followed by block 1208.

At block 1208 (Determine user type), the user type can be determined by the type of the keyword which is entered at the end (the latest keyword). Alternatively, the user type can be determined by the majority type of the last three keywords. The classifying unit 1106 may be adapted to determine user type by the simple majority decision if the number of keywords in each user type is not substantially the same. If the number of acoustic keywords is greater than the number of the visual keywords, the user type can be determined to be the acoustic dominant type. If the number of visual keywords is greater than the number of the acoustic keywords, then the classifying unit may determine whether the user is the shape-dominant visual type or the color-dominant visual type by a simple majority decision. In case the number of the color-dominant keywords is substantially the same as the number of the shape-dominant keywords, the user type may be determined by the order of the word entry. Block 1208 may be followed by block 1209.

At block 1209 (Determine data that is firstly processed), the determining unit 1108 may be adapted to receive the user type from the classifying unit 1106 and the content provided from the content acquisition unit 1105. The determining unit 1108 can be adapted to determine which data is to be processed first in the providing content based on the user type. The determining unit 1108 may be adapted to determine which data signals are given priority for processing based on the user type. If the user type is determined to be the acoustic dominant type, audio data may be given a higher priority to be firstly processed for playing. If the user type is determined to be the visual dominant type, image processing is given priority over other data processing. The determining unit 1108 may be adapted to give a higher priority in accordance with the user dominant type. If the user type is determined to be either shape-dominant or color-dominant of the visual type, the determining unit 1108 may be adapted to send information indicating colors and shapes in the image data for display processing. Block 1209 may be followed by block 1210.

At block 1210 (Is the first processing data image?), the data processing unit 1109 may be adapted to perform data processing for displaying or playing (e.g., communicating an audio signal to a playback device) the providing content in accordance with the priority information from the determining unit 1108. The data processing unit 1109 may be adapted to determine whether the first processing data is image data based on the priority information. If the priority information indicates the visual dominant type, the data processing unit 1109 may be adapted to determine the first processing data is an image. If the priority information indicates the acoustic dominant type, the data processing unit 1109 may be adapted to determine the first processing data is audio data. Block 1210 may be followed by block 1211 and/or block 1214.

At block 1211 (Process audio data), the data processing unit 1109 may be adapted to firstly process audio data in the received content data for playing (e.g., communicating audio data to an audio playback device such as a speaker, headphones, etc.), if the first processing data is audio data. Block 1211 may be followed by block 1212.

At block 1212 (Process text data), the data processing unit 1109 may be adapted to process text data for output (e.g., transmitting an electrical signal to a display). Block 1212 may be followed by block 1213.

At block 1213 (Process other data), the data processing unit 1109 may be adapted to process other data for output (e.g., transmitting an electrical signal to a display), such as image data. Block 1213 may be followed by block 1223.

At block 1214 (Is the first processing data shape?), the data processing unit 1109 may be adapted to determine whether the first processing data is shape data in image data based on the priority information. If the priority information indicates shape-dominant of the visual type, the data processing unit 1109 may be adapted to process shape data (e.g., transmitting an electrical signal to a display) for displaying shape in the image data. If the priority information indicates color-dominant of the visual type, the data processing unit 1109 may be adapted to determine color data in the image data as the first processing data. Block 1214 may be followed by block 1215 and/or block 1219.

At block 1215 (Process shapes in images), shape data in image data may be firstly processed. The data processing unit 1109 may use the information indicating area of colors and shapes in the image data to process the image data for displaying shaped object images. In an example embodiment, the image data may include shape data so that the data processing unit 1109 may be adapted to firstly process the shape data to display shaped objects in the image data. In another embodiment, the data processing unit 1109 may be adapted to detect edge in image data for displaying shaped object. In another embodiment, the data processing unit 1109 may be adapted to output black and white image data or gray scale image data to the display 1110. Block 1215 may be followed by block 1216.

At block 1216 (Process others in images), the data processing unit 1109 may be adapted to process other data in the image data. All of the data in the image data may be processed for output on the display 1110 as all the image data is processed sufficient to be output. Block 1216 may be followed by block 1217.

At block 1217 (Process text data), the data processing unit 1109 may be adapted to process text data in the content for output (e.g., transmitting an electrical signal to a display). Block 1217 may be followed by block 1218.

At block 1218 (Process other data), the data processing unit 1109 may be adapted to process other data in the content (e.g., transmitting an electrical signal to a display and/or an audio playback device, such as a speaker, headphone etc,). Other data may be audio data and/or text data. Block 1218 may be followed by block 1223.

At block 1219 (Process colors in images), the data processing unit 403 may be adapted to process color data in the image data firstly. In one embodiment, the data processing unit 1109 may be adapted to process the image data to display with relatively low color depth, such as 4-bit or 8-bit color even though the image data has full color, such as 32-bit color. In another embodiment, the data processing unit 1109 may be adapted to process the image data to display low-resolution image, such as a preview of progressive JPEG format image data or interlaced GIF format image data. Block 1219 may be followed by block 1220.

At block 1220 (Process others in images), the data processing unit 1109 may be adapted to process other data in the image data. In one embodiment, the data processing unit 1109 may be adapted to process the image data sufficiently to display the image data having full color, such as 32-bit color. In another embodiment, the data processing unit 1109 may be adapted to process the image data to display sufficient resolution images. Block 1220 may be followed by block 1221.

At block 1221 (Process text data), the data processing unit 1109 may be adapted to process text data in the content for output (e.g., transmitting an electrical signal to a display). Block 1221 may be followed by block 1222.

At block 1222 (Process other data), the data processing unit 1109 may be adapted to process other data in the content for output (e.g., transmitting an electrical signal to a display and/or an audio playback device, such as a speaker, headphone etc,). Other data may be audio data and/or text data. Block 1222 may be followed by block 1223.

At block 1223 (Output all data in the content), all of the data in the received content may be output (e.g., communicated or sent to) on the display 1110 or speaker 1111 at the end.

In this example disclosure, second processing data is text, however second processing data can be any kind of data except for the audio data. In case the providing content is an HTML document, the data processing unit 1109 may check tags representing data type, such as text and image for changing the order of tag processing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and nonvolatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
receiving content search conditions associated with a user, wherein the content search conditions include at least a first word and a second word;
calculating a first score of a first user type and a second score of a second user type by referring the at least first word and the second word to a word list data stored in a system memory;
classifying the user into the first user type based on a comparison between the first score of the first user type and the second score of the second user type, wherein the word list data comprises the first score of the first word, the first user type associated with the first word, the second score of the second word, and the second user type associated with the second word;
in response to the first score of the first user type being equal to the second score of the second user type, classifying the user into the first user type based on a number of words associated with the first user type included in the content search conditions or an order associated with the first word and the second word in the content search conditions;
acquiring content that includes non-text data based on the received search conditions; and
evaluating the acquired content to identify data of the non-text data in the acquired content that is firstly processed for output based on the first user type or the second user type.

2. The method according to claim 1, further comprising searching content based on the content search conditions, and wherein acquiring content comprises acquiring content according to the content search conditions.

3. The method according to claim 1, further comprising identifying image data as data that is firstly processed for output in response to determination that the non-text data includes image data.

4. The method according to claim 1, further comprising identifying audio data as data that is firstly processed for output in response to determination that the non-text data includes audio data.

5. A content providing apparatus, comprising:
a data processor unit;
a receiver unit configured to receive content search conditions associated with a user, wherein the content search conditions include at least a first word and a second word;
a classification unit configured to analyze the received search conditions and classify the user into a user type based on the analysis
calculate a first score of a first user type and a second score of a second user type by referring the at least first word and the second word to a word list data stored in a system memory,
classify the user into the first user type based on a comparison between the first score of the first user type and the second score of the second user type, wherein the word list data comprises the first score of the first word, the first user type associated with the first word, the second score of the second word, and the second user type associated with the second word, and
in response to the first score of the first user type being equal to the second score of the second user type, classify the user into the first user type based on a number of words associated with the first user type included in the content search conditions or an order associated with the first word and the second word in the content search conditions;
a content acquisition unit configured to acquire content that includes non-text data based on the received search conditions; and
a determination unit configured to evaluate the acquired content to identify data of the non-text data that is firstly processed, by the data processor unit, in the acquired content for output based on the first user type or the second user type.

6. The content providing apparatus according to claim 5, wherein the classification unit is configured to classify the user into the first user type by determination of a dominant sense of the user from the received search conditions.

7. The content providing apparatus according to claim 6, wherein the determination unit is further configured to identify image data as data that is firstly processed for output after the classification unit classifies users into a visual dominant type.

8. The content providing apparatus according to claim 7, wherein the determination unit is further configured to identify shape data of the image data as data that is firstly processed for output after the classification unit classifies the user into a shape dominant visual type.

9. The content providing apparatus according to claim 7, wherein the determination unit is further configured to identify color data of the image data as data that is firstly processed for output after the classification unit classifies the user into a color dominant visual type.

10. The content providing apparatus according to claim 7, wherein the determination unit is further configured to identify image data having a tag corresponding to the content search conditions as data that is firstly processed for output in response to the acquired content being a hypertext markup language (HTML) document.

11. The content providing apparatus according to claim 6, wherein the determination unit is further configured to identify audio data as data that is firstly processed for output after the classification unit classifies the user into an acoustic dominant type.

12. The content providing apparatus according to claim 5 wherein the classification unit is configured to classify the user based on words of the content search conditions by a majority decision criteria.

13. The content providing apparatus according to claim 5 wherein the classification unit is configured to classify the user based on words of the content search conditions by a weighted decision criteria.

14. The content providing apparatus according to claim 5 wherein the classification unit is configured to classify the user based on words of the content search conditions by a decision made from a time order associated with the words.

15. The content providing apparatus according to claim 5, wherein the classification unit is adapted to analyze the content search conditions by a morphological analysis criteria.

16. The content providing apparatus according to claim 5, further comprising a searcher unit configured to search content based on the content search conditions, wherein the content acquisition unit is adapted to acquire content according to the content search conditions.

17. The content providing apparatus according to claim 16, wherein the determination unit is configured to determine a content list to display as the content search result based on the determined user type.

18. The content providing apparatus according to claim 5, wherein the non-text data includes image data, and wherein the determination unit is configured to determine the image data as data that is firstly processed for output.

19. The content providing apparatus according to claim 5, wherein the non-text data includes audio data, and wherein the determination unit is configured to determine the audio data as data that is firstly processed for output.

20. A non-transitory computer readable medium whose contents, in response to execution by a circuit cause the circuit to perform or control performance of:
    identifying content search conditions associated with a user, wherein the content search conditions include at least a first word and a second word:
    calculating a first score of a first user type and a second score of a second user type by referring the at least first word and the second word to a word list data stored in a system memory;
    classifying the user into the first user type based on a comparison between the first score of the first user type and the second score of the second user type, wherein the word list data comprises the first score of the first word, the first user type associated with the first word, the second score of the second word, and the second user type associated with the second word;
    in response to that the first score of the first user type being equal to the second score of the second user type, classifying the user into the first user type based on a number of words associated with the first user type included in the content search conditions or an order associated with the first word and the second word in the content search conditions:
    acquiring content that includes non-text data based on the received search conditions; and
    evaluating the acquired content to identify data of the non-text data in the acquired content that is firstly processed for output based on the first user type or the second user type.

21. The non-transitory computer readable medium of claim 20, wherein the contents further cause the circuit to perform or control performance of:
    classifying the user into the first user type according to a dominant sense that is identified in the received search conditions.

* * * * *

UNITED STATES PATENT AND TRADEMARK OFFICE
CERTIFICATE OF CORRECTION

| | | |
|---|---|---|
| PATENT NO. | : 9,489,384 B2 | Page 1 of 1 |
| APPLICATION NO. | : 13/992737 | |
| DATED | : November 8, 2016 | |
| INVENTOR(S) | : Miyasato et al. | |

It is certified that error appears in the above-identified patent and that said Letters Patent is hereby corrected as shown below:

In the Specification

In Column 1, Line 8, delete "§371" and insert -- § 371 --, therefor.

In the Claims

In Column 20, Lines 39-41, in Claim 5, delete "to analyze…the analysis" and insert -- to: --, therefor.

Signed and Sealed this
Sixteenth Day of May, 2017

Michelle K. Lee
*Director of the United States Patent and Trademark Office*